(12) United States Patent
Togashi et al.

(10) Patent No.: US 8,659,871 B2
(45) Date of Patent: Feb. 25, 2014

(54) MULTILAYER CAPACITOR HAVING REDUCED EQUIVALENT SERIES INDUCTANCE

(75) Inventors: Masaaki Togashi, Tokyo (JP); Kazuyuki Hasebe, Tokyo (JP)

(73) Assignee: TDK Corporation, Tokyo (JP)

( * ) Notice: Subject to any disclaimer, the term of this patent is extended or adjusted under 35 U.S.C. 154(b) by 267 days.

(21) Appl. No.: 12/904,640

(22) Filed: Oct. 14, 2010

(65) Prior Publication Data

US 2011/0096463 A1    Apr. 28, 2011

(30) Foreign Application Priority Data

Oct. 23, 2009 (JP) ................ P2009-244796

(51) Int. Cl.
*H01G 4/005* (2006.01)
*H01G 4/228* (2006.01)
*H01G 4/06* (2006.01)

(52) U.S. Cl.
USPC ............... 361/303; 361/306.3; 361/321.2

(58) Field of Classification Search
USPC ........ 361/321.2, 303, 306.3, 304, 305, 321.3, 361/321.4
See application file for complete search history.

(56) References Cited

U.S. PATENT DOCUMENTS

| | | | |
|---|---|---|---|
| 6,829,134 B2 * | 12/2004 | Yamauchi et al. | 361/303 |
| 7,292,429 B2 * | 11/2007 | Randall et al. | 361/303 |
| 7,457,099 B2 * | 11/2008 | Togashi et al. | 361/306.3 |
| 7,495,885 B2 * | 2/2009 | Togashi et al. | 361/306.3 |
| 8,045,319 B2 | 10/2011 | Ritter et al. | |
| 8,130,484 B2 * | 3/2012 | Koga et al. | 361/303 |
| 2008/0144253 A1 * | 6/2008 | Togashi | 361/301.4 |
| 2009/0109596 A1 * | 4/2009 | Togashi | 361/303 |

FOREIGN PATENT DOCUMENTS

| | | | |
|---|---|---|---|
| JP | U-62-124836 | | 8/1987 |
| JP | 05135990 A | * | 6/1993 |
| JP | A-6-69063 | | 3/1994 |
| JP | A-9-50935 | | 2/1997 |
| JP | 10064703 A | * | 3/1998 |
| JP | 10097948 A | * | 4/1998 |
| JP | 2000252159 A | * | 9/2000 |
| JP | 2002299148 A | * | 10/2002 |
| JP | A-2004-140183 | | 5/2004 |
| JP | 2005216955 A | * | 8/2005 |
| JP | 2008085054 A | * | 4/2008 |
| JP | 2009065198 A | * | 3/2009 |
| JP | A-2009-60080 | | 3/2009 |

* cited by examiner

*Primary Examiner* — David M Sinclair
(74) *Attorney, Agent, or Firm* — Oliff PLC

(57) ABSTRACT

A multilayer capacitor is provided with improved reliability and reduced ESL. In a width direction, a second principal-surface electrode portion is greater than a first principal-surface electrode portion, and a fifth principal-surface electrode portion is greater than a fourth principal-surface electrode portion. When viewed from a lamination direction, an outer edge of the second principal-surface electrode portion at the other end side is arranged near the other end side more than outer edge of the fifth principal-surface electrode portion at one end side. First lead portions are connected to the second principal-surface electrode portion, and second lead portions are connected to the fifth principal-surface electrode portion. Thus, portions of the second principal-surface electrode portion greater than the first principal-surface electrode portion and portions of the fifth principal-surface electrode portion greater than the fourth principal-surface electrode portion function as current paths between the first lead portions and the second lead portions.

9 Claims, 9 Drawing Sheets

MULTILAYER CAPACITOR HAVING REDUCED EQUIVALENT SERIES INDUCTANCE

BACKGROUND OF THE INVENTION

1. Field of the Invention

The present invention relates to a multilayer capacitor.

2. Related Background Art

A multilayer capacitor is known which includes an element body formed by laminating a plurality of dielectric layers, a pair of terminal electrodes formed at both end portions of the element body, a first internal electrode formed inside the element body to extend from one end surface of the element body and connected one terminal electrode, and a second internal electrode formed inside the element body to extend from the other end surface of the element body and connected to the other terminal electrode (for example, see Japanese Utility Model Application Laid-Open No. 62-124836).

SUMMARY OF THE INVENTION

In general, a multilayer capacitor has ESL (Equivalent Series Inductance) which is a minute inductance component, and there is demand for reduction in the ESL. The above-described multilayer capacitor is intended to reduce the ESL, and brings the internal electrode close to the mounting surface, reducing the ESL. However, in the above-described multilayer capacitor, the ESL reduction effect is insufficient, and there is demand for further reduction in the ESL. In the configuration such that the internal electrode is simply brought close to the mounting surface, in mounting the substrate, if the substrate is not mounted in an appropriate mounting direction, the ESL reduction effect is not obtained, and there is a problem with availability. Thus, there is demand for improvement in reliability of the multilayer capacitor.

The invention has been finalized in order to solve the above problems, and an object of the invention is to provide a multilayer capacitor capable of improving reliability and further reducing ESL.

A multilayer capacitor according to an embodiment of the invention includes an element body formed by laminating a plurality of dielectric layers, the element body having a pair of end surfaces and four lateral surfaces connecting the end surfaces, a first terminal electrode covering one end side of the element body, a second terminal electrode covering the other end side of the element body, a first internal electrode formed inside the element body to extend between the one end side of the element body and the other end side of the element body, and electrically connected to the first terminal electrode, and a second internal electrode formed inside the element body to extend between the one end side of the element body and the other end side of the element body with a dielectric layer sandwiched between the second internal electrode and first internal electrode, and electrically connected to the second terminal electrode. The first terminal electrode has a first end portion covering the end surface at the one end side of the element body and first lateral portions covering the one end side of the element body at the four lateral surfaces. The second terminal electrode has a second end portion covering the end surface at the other end side of the element body and second lateral portions covering the other end side of the element body at the four lateral surfaces. The first internal electrode has a first principal-surface electrode portion and a second principal-surface electrode portion in order from the other end side of the element body toward the one end side of the element body, and a first lead portion respectively connecting the second principal-surface electrode portion and the first lateral portion of the first terminal electrode. The second internal electrode has a fourth principal-surface electrode portion and a fifth principal-surface electrode portion in order from the one end side of the element body toward the other end side of the element body, and a second lead portion respectively connecting the fifth principal-surface electrode portion and the second lateral portion of the second terminal electrode. In the width direction of the first internal electrode and the second internal electrode, the second principal-surface electrode portion is greater than the first principal-surface electrode portion, and the fifth principal-surface electrode portion is greater than the fourth principal-surface electrode portion. When viewed from the lamination direction of the element body, the outer edge of the second principal-surface electrode portion at the other end side of the element body is arranged near the other end side more than the outer edge of the fifth principal-surface electrode portion at the one end side of the element body, or arranged so as to be aligned with the outer edge of the fifth principal-surface electrode portion at the one end side of the element body.

In this multilayer capacitor, the first lead portion respectively connects the second principal-surface electrode portion and the first lateral portion of the first terminal electrode, and the second lead portion respectively connects the fifth principal-surface electrode portion and the second lateral portion of the second terminal electrode. In this way, the first lead portion and the second lead portion having different polarities are led to the same lateral surface of the element body, and the lateral portions are formed at the lateral surfaces of each terminal electrode. Thus, the inter-lead-electrode distance between the first lead portion and the second lead portion having different polarities is shortened compared to a case where the internal electrode is simply led from the end surface of the element body. That is, a current path can be shortened, reducing the ESL. Each lead portion is led to the lateral surface of the element body, reducing variations in the ESL depending on the mounting direction. In the width direction, the second principal-surface electrode portion is greater than the first principal-surface electrode portion, and the fifth principal-surface electrode portion is greater than the fourth principal-surface electrode portion. When viewed from the lamination direction, the outer edge of second principal-surface electrode portion at the other end side is arranged near the other end side more than the outer edge side of the fifth principal-surface electrode portion at the one end side, or arranged to be aligned with the outer edge of the fifth principal-surface electrode portion at the one end side. The first lead portion is connected to the second principal-surface electrode portion, and the second lead portion is connected to the fifth principal-surface electrode portion. Thus, portions of the second principal-surface electrode portion greater than the first principal-surface electrode portion and portions of the fifth principal-surface electrode portion greater than the fourth principal-surface electrode portion function as current path between the first lead portion and the second lead portion, making it possible to shorten the current path. Therefore, the reliability can be improved, and the ESL can be further reduced.

In the multilayer capacitor according to the invention, in the longitudinal direction of the first internal electrode and the second internal electrode, the outer edge of the second principal-surface electrode portion at the other end side of the element body may extend to the second lead portion, and the outer edge of the fifth principal-surface electrode portion at the one end side of the element body may extend to the first lead portion. Therefore, the current path (for example, EL1 and EL2 of FIGS. 6A and 6B) can be ensured reliably, and the ESL can be reduced.

The first lead portion may has a first small-width portion extending from the second principal-surface electrode portion in the width direction and a first connection portion extending toward the one end side of the element body at portion where connection is made to the first lateral portion of the first terminal electrode. The second lead portion may has a second small-width portion extending from the fifth principal-surface electrode portion in the width direction and a second connection portion extending toward the other end side of the element body at portion where connection is made to the second lateral portion of the second terminal electrode. With this configuration, since the small-width portion is arranged inside the element body more than the connection portion, the current path can be shortened, and the ESL can be made low. In addition, since the connection portions are formed, connectivity to the terminal electrode can be ensured. The surfaces of the dielectric layers are exposed between the small-width portions and the connection portions, increasing the exposed area of the dielectric layer. A portion where the dielectric layer is exposed is rigidly fixed to the rear surface of the overlying dielectric layer at the time of calcination. Therefore, adhesiveness of the element body 1 can be improved. With the small-width portions, the ESL can be adjusted.

The first internal electrode may have a first additional lead portion connected to the first end portion of the first terminal electrode, and the second internal electrode may have a second additional lead portion connected to the second end portion of the second terminal electrode. With an increase in the number of lead portions, the ESL can be further reduced.

The first internal electrode may have a third principal-surface electrode portion at the one end side of the element body in the second principal-surface electrode portion, and the second internal electrode may have a sixth principal-surface electrode portion at the other end side of the element body in the fifth principal-surface electrode portion. In the lamination direction of the element body, the fourth principal-surface electrode portion may overlap the third principal-surface electrode portion, and the first principal-surface electrode portion may overlap the sixth principal-surface electrode portion. When viewed from the lamination direction, the outer edge of the third principal-surface electrode portion may be arranged so as to surround the forefront portion of the fourth principal-surface electrode portion at the one end side of the element body, and the outer edge of the sixth principal-surface electrode portion may be arranged so as to surround the forefront portion of the first principal-surface electrode portion at the other end side of the element body. When viewed from the lamination direction, the outer edge of the third principal-surface electrode portion is arranged so as to surround the forefront portion of the fourth principal-surface electrode portion at the one end side of the element body, and the outer edge of the sixth principal-surface electrode portion is arranged so as to surround the forefront portion of the first principal-surface electrode portion at the other end side of the element body. For this reason, even when lamination misalignment occurs, the third principal-surface electrode portion can be maintained in a state of overlapping the fourth principal-surface electrode portion, and the sixth principal-surface electrode portion can be maintained in a state of overlapping the first principal-surface electrode portion. Therefore, variations in electrostatic capacitance due to the lamination misalignment can be suppressed.

According to the aspect of the invention, reliability can be improved and the ESL can be further reduced.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
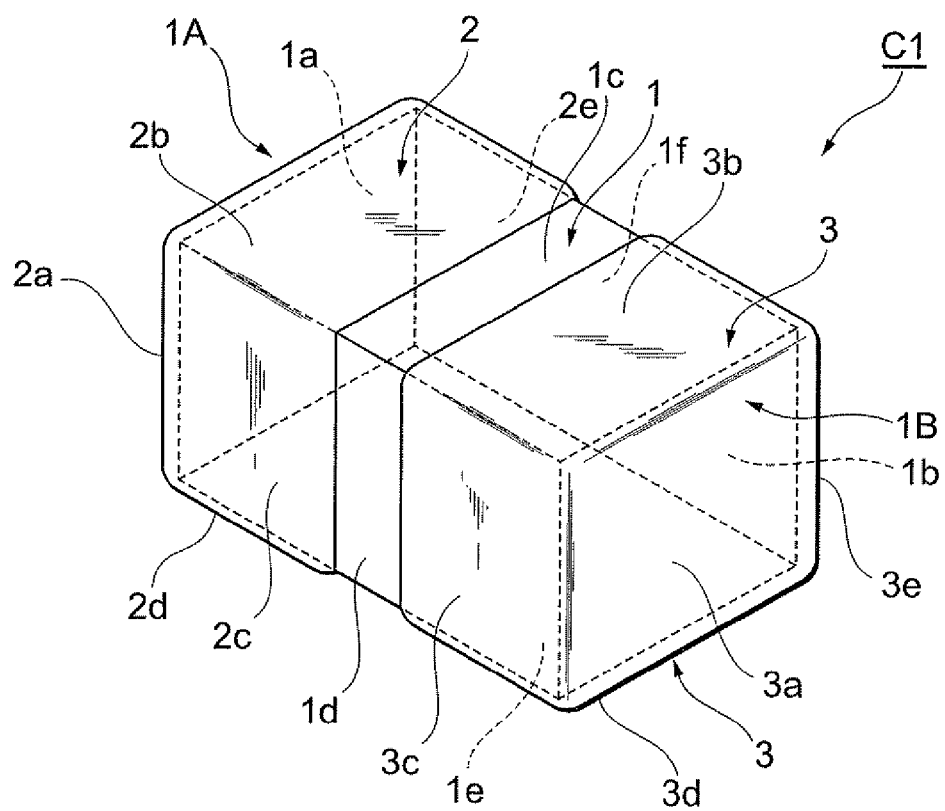
FIG. 1 is a perspective view showing a multilayer capacitor according to a first embodiment.

Hereinafter, preferred embodiments of the invention will be described in detail with reference to the accompanying drawings. In the description, the same elements or elements having the same functions are represented by the same reference numerals, and overlapping description will be omitted.

First Embodiment

Figure 2:
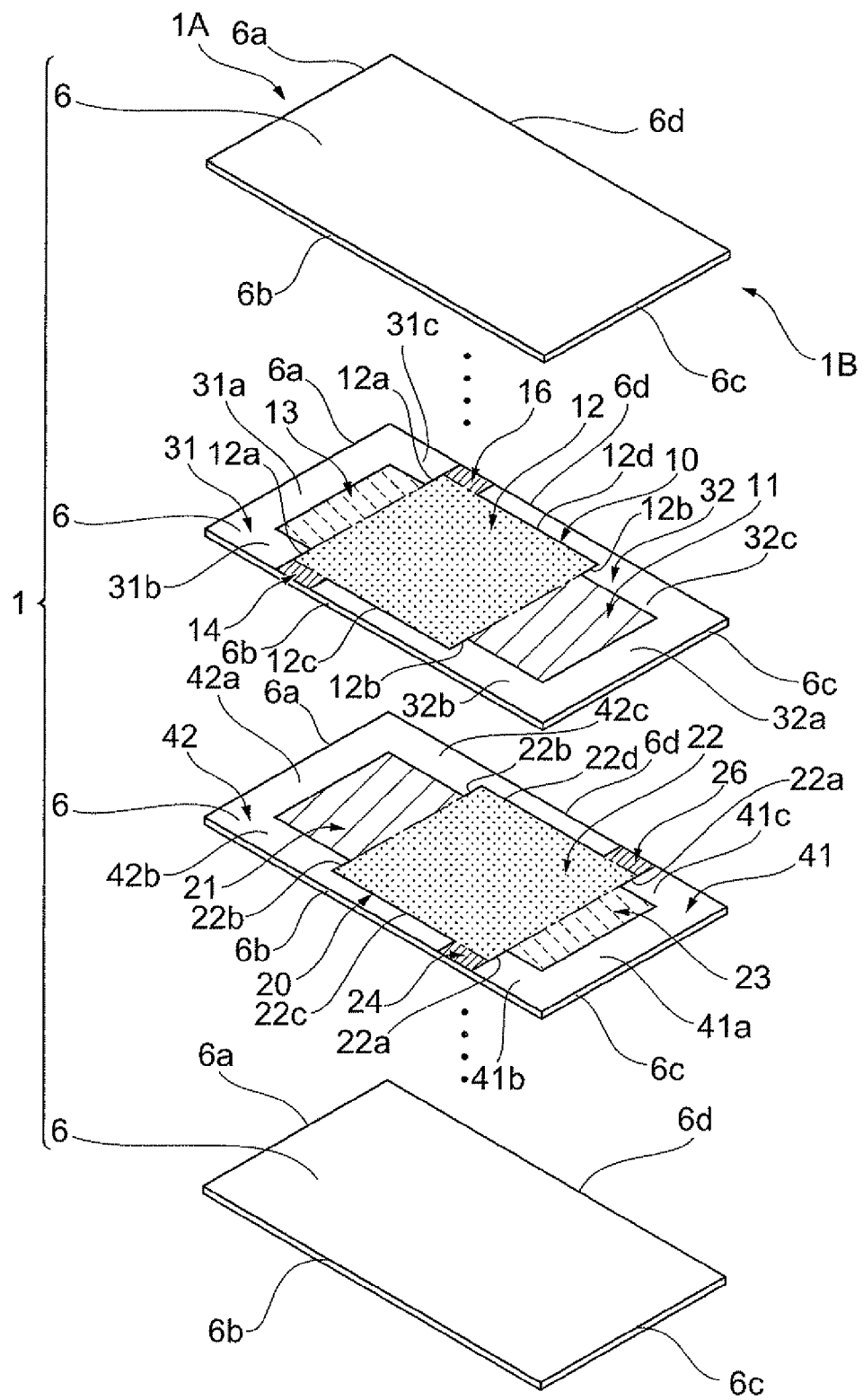
FIG. 2 is an exploded view of an element body when exploded by dielectric layer.
Figure 3:
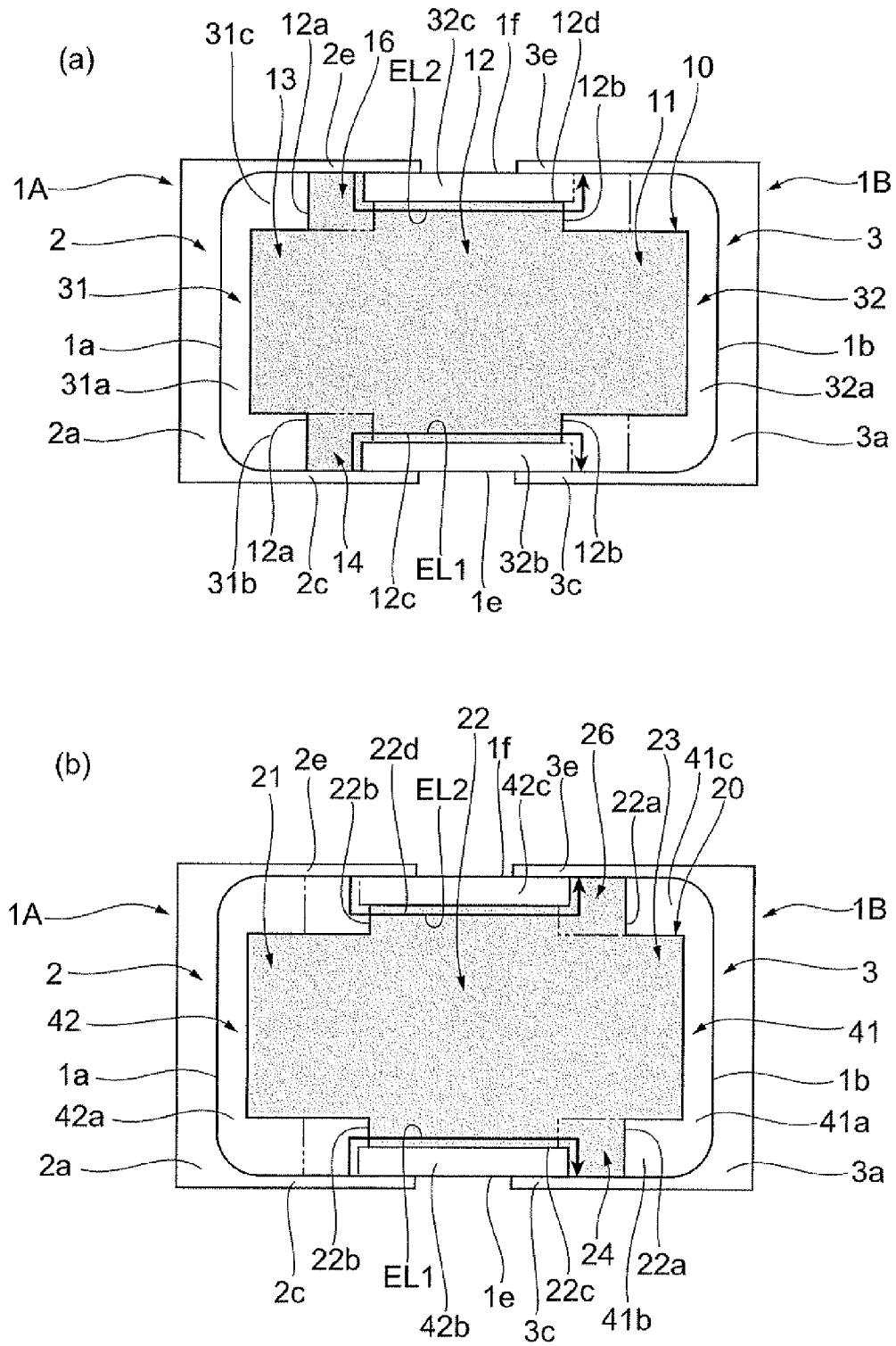
FIGS. 3A and 3B are diagrams of a first internal electrode and a second internal electrode of the multilayer capacitor according to the first embodiment when viewed from a lamination direction.

The configuration of a multilayer capacitor C1 according to a first embodiment will be described with reference to FIGS. 1 to 3B. FIG. 1 is a perspective view showing the multilayer capacitor C1 according to the first embodiment. FIG. 2 is an exploded view of an element body when exploded by dielectric layer. FIGS. 3A and 3B are diagrams of a first internal electrode and a second internal electrode when viewed from a lamination direction. In FIG. 3A, a solid line indicates the first internal electrode, and a virtual line indicates the second internal electrode. In FIG. 3B, a solid line indicates the second internal electrode, and a virtual line indicates the first internal electrode. As shown in FIG. 1, the multilayer capacitor C1 includes an element body 1 which is constituted to have a substantially rectangular parallelepiped having a plurality of rectangular plate-shaped dielectric layers laminated as a single body, and a first terminal electrode 2 and a second terminal electrode 3. The multilayer capacitor C1 has about length:width:thickness=2:1:0.6 as a dimension ratio of length, width, and thickness, for example, about 1.0 mm×0.5 mm×0.3 mm or about 0.6 mm×0.3 mm×0.2 mm.

The element body 1 has an end surface 1a at one end 1A side of the element body 1 and an end surface 1b at the other end 1B side. The element body 1 also has four lateral surfaces 1c, 1d, 1e, and 1f which connect the end surface 1a and the end surface 1b.

The first terminal electrode 2 is an external electrode which covers the one end 1A side of the element body 1. The first terminal electrode 2 has a first end portion 2a which covers an end surface 1a of the element body 1, a first lateral portion 2b which covers a lateral surface 1c at the one end 1A side, a first lateral portion 2c which covers a lateral surface 1d at the one end 1A side, a first lateral portion 2d which covers a lateral surface 1e at the one end 1A side, and a first lateral portion 2e which covers a lateral surface 1f at the one end 1A side. The second terminal electrode 3 is an external electrode which covers the other end 1B side of the element body 1. The second terminal electrode 3 has a second end portion 3a which covers an end surface 1b of the element body 1, a second lateral portion 3b which covers a lateral surface 1c at the other end 1B side, a second lateral portion 3c which covers a lateral surface 1d at the other end 1B side, a second lateral portion 3d which covers a lateral surface 1e at the other end 1B side, and a second lateral portion 3e which covers a lateral surface 1f at the other end 1B side. The first terminal electrode 2 and the second terminal electrode 3 are formed by attaching conductive paste mainly containing Cu, Ni, Ag, Pd, or the like to the outer surface of the element body 1 through dipping or the like, performing baking at a predetermined temperature (for example, about 700° C.), and performing electrical plating. For electrical plating, Ni, Sn, or the like may be used. The thickness of each of the first terminal electrode 2 and the second terminal electrode 3 is set in a range of 10 to 30 μm. The length of each of the lateral portions 2b to 2e of the first terminal electrode 2 to the other end 1B side and the length of each of the lateral portions 3b to 3e of the second terminal electrode 3 to the one end 1A side are set to be about 30% to 40% with respect to the length of the element body 1.

As shown in FIG. 2, the element body 1 is a laminate in which a plurality of rectangular plate-shaped dielectric layers 6, and a plurality of first internal electrodes 10 and second internal electrodes 20. The first internal electrodes 10 and the second internal electrodes 20 are arranged inside the element body 1 one by one along the lamination direction of the dielectric layers 6 (hereinafter, simply referred to as "lamination direction"). The first internal electrode 10 and the second internal electrode 20 are arranged to be opposite each other so as to sandwich at least one dielectric layer 6 therebetween. In the practical multilayer capacitor C1, a plurality of dielectric layers 6 are combined as a single body such that the boundary therebetween cannot be viewed. Specifically, as shown in FIG. 2, in the element body 1, a ceramic green sheet with the electrode pattern of the first internal electrode 10 formed thereon and a ceramic green sheet with the electrode pattern of the second internal electrode 20 formed thereon are laminated between ceramic green sheets with no electrode pattern formed thereon and combined as a single body through calcination. Each ceramic green sheet mainly contains $BaTiO_3$, $CaZrO_3$, or the like, and the thickness thereof, that is, the thickness of the dielectric layer 6 after calcination is in a range of 1 μm to 2 μm. Although a plurality of first internal electrodes 10 and second internal electrodes 20 are formed inside the element body 1, in FIG. 2, one dielectric layer 6 with the first internal electrode 10 formed thereon and one dielectric layer 6 with the second internal electrode 20 formed thereon are shown.

The first internal electrode 10 is formed inside the element body 1 to extend between the one end 1A side and the other end 1B side of the element body 1, and is electrically connected to the first terminal electrode 2. The second internal electrode 20 is formed inside the element body 1 to extend between the one end 1A side and the other end 1B side of the element body 1 with the dielectric layer 6 sandwiched between the first internal electrode 10 and the second internal electrode 20, and is electrically connected to the second terminal electrode 3. The first internal electrode 10 and the second internal electrode 20 contain a conductive material, such as Ni, Ni alloy, or the like, and are constituted as a sintered body of conductive paste containing the relevant conductive material. The thickness of each of the first internal electrode 10 and the second internal electrode 20 after sintering is in a range of 0.8 μm to 1.5 μm. In the following description, the direction in which the first internal electrode 10 and the second internal electrode 20 extend is referred to as "longitudinal direction", the width direction of the first internal electrode 10 and the second internal electrode 20 orthogonal to the longitudinal direction is referred to as "width direction".

The first internal electrode 10 has a first principal-surface electrode portion 11, a second principal-surface electrode portion 12, and a third principal-surface electrode portion 13 in order from the other end 1B side of the element body 1 toward the one end 1A side, and also has a pair of first lead portions 14 and 16 which respectively connect the second principal-surface electrode portion 12 and the first lateral portions 2c and 2e of the first terminal electrode 2. In FIG. 2, with regard to the first principal-surface electrode portion 11, the second principal-surface electrode portion 12, the third principal-surface electrode portion 13, and the first lead portions 14 and 16, the regions are delimited by a one-dot-chain line, and hatched and dotted for distinction.

The first principal-surface electrode portion 11 is a rectangular region of the first internal electrode 10 arranged at the other end 1B side. The third principal-surface electrode portion 13 is a rectangular region of the first internal electrode 10 arranged at the one end 1A side. The second principal-surface electrode portion 12 is a rectangular region of the first internal electrode 10 arranged between the first principal-surface electrode portion 11 and the third principal-surface electrode portion 13. The size of the second principal-surface electrode portion 12 in the width direction is at least greater than the size of the first principal-surface electrode portion 11 in the width direction. The size of the second principal-surface electrode portion 12 in the width direction is about 120% to 140% of the size of the first principal-surface electrode portion 11 in the width direction. The outer edge of the first principal-surface electrode portion 11 at the other end 1B side and an outer edge 6c of the dielectric layer 6 are separated from each other. The first principal-surface electrode portion 11 and an outer edge 6b of the dielectric layer 6 are separated from each other, and the first principal-surface electrode portion 11 and an outer edge 6d of the dielectric layer 6 are separated from each other. The second principal-surface electrode portion 12 and an outer edge of 6b of the dielectric layer 6 are separated from each other, and the second principal-surface electrode portion 12 and an outer edge 6d of the dielectric layer 6 are separated from each other. The third principal-surface electrode portion 13 and the outer edge 6b of the dielectric layer 6 are separated from each other, and the third principal-surface electrode portion 13 and the outer edge 6d of the dielectric layer 6 are separated from each other. The outer edge of the third principal-surface electrode portion 13 at the one end 1A side and the outer edge 6a of the dielectric layer 6 are separated from each other. The first lead portion 14 extends from the second principal-surface electrode portion 12 in the width direction and reaches the outer edge 6b of the dielectric layer 6. The first lead portion 16 extends from the second principal-surface electrode portion 12 in the width direction and reaches the outer edge 6d of the dielectric layer 6. The positions of the first lead portions 14 and 16 in the longitudinal direction are not particularly limited insofar as the first lead portions 14 and 16 can be respectively connected to the first lateral portions 2c and 2e of the first terminal electrode 2. The first lead portions 14 and 16 are respectively arranged at both edges of the second principal-surface electrode portion 12 in the width direction in the end portion at the one end 1A side. Thus, the second principal-surface electrode portion 12 is defined as a region where the first lead portions 14 and 16 are respectively formed at both edges in the width direction in the end portion at the one end 1A side.

In the multilayer capacitor C1 according to the first embodiment, an outer edge 12b of the second principal-surface electrode portion 12 at the other end 1B side (an outer edge at the other end side of the element body) is arranged near the other end 1B side from the center position of the element body 1 in the longitudinal direction. Meanwhile, an outer edge 12a of the second principal-surface electrode portion 12 at the one end 1A side is arranged at the substantially center position of each of the lateral portions 2b to 2e of the first terminal electrode 2 in the longitudinal direction. The first lead portions 14 and 16 are arranged such that the outer edges thereof at the one end 1A side are aligned with the outer edge 12a of the second principal-surface electrode portion 12. The first principal-surface electrode portion 11 and the third principal-surface electrode portion 13 have the same size in the width direction. The size of the second principal-surface electrode portion 12 in the width direction is greater than the size of each of the first principal-surface electrode portion 11 and the third principal-surface electrode portion 13 in the width direction. The first internal electrode 10 has a shape line-symmetrical with respect to the center axis in the width direction of the dielectric layer 6.

In this embodiment, an exposed portion 31 where the surface of the dielectric layer 6 is exposed is formed near the one end 1A side more than the first lead portions 14 and 16. The exposed portion 31 has a side portion 31a between the outer edge 6a and the third principal-surface electrode portion 13, a side portion 31b between the outer edge 6b and the third principal-surface electrode portion 13, and a side portion 31c between the outer edge 6d and the third principal-surface electrode portion 13. An exposed portion 32 where the surface of the dielectric layer 6 is exposed is formed near the other end 1B side more than the first lead portions 14 and 16. The exposed portion 32 has a side portion 32a between the outer edge 6c and the first principal-surface electrode portion 11, a side portion 32b between the outer edge 6b and the first and second principal-surface electrode portion 11 and between the outer edge 6b and the second principal-surface electrode portion 12, and a side portion 32c between the outer edge 6d and the first principal-surface electrode portion 11 and between the outer edge 6d and the second principal-surface electrode portion 12.

The second internal electrode 20 has a fourth principal-surface electrode portion 21, a fifth principal-surface electrode portion 22, and a sixth principal-surface electrode portion 23 in order from the one end 1A side of the element body 1 toward the other end 1B side, and also has a pair of second lead portions 24 and 26 which respectively connect the fifth principal-surface electrode portion 22 and the second lateral portions 3c and 3e of the second terminal electrode 3. In FIG. 2, with regard to the fourth principal-surface electrode portion 21, the fifth principal-surface electrode portion 22, the sixth principal-surface electrode portion 23, and the second lead portions 24 and 26, the regions are delimited by a one-dot-chain line, and hatched and dotted for distinction. The second internal electrode 20 has a shape such that the first internal electrode 10 is moved point-symmetrically at 180° with respect to the center axis of the element body 1 in the lamination direction.

The fourth principal-surface electrode portion 21 is a rectangular region of the second internal electrode 20 arranged at the one end 1A side. The sixth principal-surface electrode portion 23 is a rectangular region of the second internal electrode 20 arranged at the other end 1B side. The fifth principal-surface electrode portion 22 is a rectangular region of the second internal electrode 20 arranged between the fourth principal-surface electrode portion 21 and the sixth principal-surface electrode portion 23. The size of the fifth principal-surface electrode portion 22 in the width direction is at least greater than the size of the fourth principal-surface electrode portion 21 in the width direction. The size of the fifth principal-surface electrode portion 22 in the width direction is about 120% to 140% of the size of the fourth principal-surface electrode portion 21 in the width direction. The outer edge of the fourth principal-surface electrode portion 21 at the one end 1A side and an outer edge 6a of the dielectric layer 6 are separated from each other. The fourth principal-surface electrode portion 21 and an outer edge 6b of the dielectric layer 6 are separated from each other, and the fourth principal-surface electrode portion 21 and an outer edge 6d of the dielectric layer 6 are separated from each other. The fifth principal-surface electrode portion 22 and the outer edge 6b of the dielectric layer 6 are separated from each other, and the fifth principal-surface electrode portion 22 and the outer edge 6d of the dielectric layer 6 are separated from each other. The sixth principal-surface electrode portion 23 and the outer edge 6b of the dielectric layer 6 are separated from each other, and the sixth principal-surface electrode portion 23 and the outer edge 6d of the dielectric layer 6 are separated from each other. The outer edge of the sixth principal-surface electrode portion 23 at the other end 1B side and an outer edge 6c of the dielectric layer 6 are separated from each other. The second lead portion 24 extends from the fifth principal-surface electrode portion 22 in the width direction and reaches the outer edge 6b of the dielectric layer 6. The second lead portion 26 extends from the fifth principal-surface electrode portion 22 in the width direction and reaches the outer edge 6d of the dielectric layer 6. The positions of the second lead portions 24 and 26 in the longitudinal direction are not particularly limited insofar as the second lead portions 24 and 26 can be respectively connected to the second lateral portions 3c and 3e of the second terminal electrode 3. The second lead portions 24 and 26 are arranged at both edges of the fifth principal-surface electrode portion 22 in the width direction in the end portion at the other end 1B side. The fifth principal-surface electrode portion 22 is defined as a region where the second lead portions 24 and 26 are formed at both edges in the width direction in the end portion at the other end 1B side.

In the multilayer capacitor C1 according to the first embodiment, an outer edge 22b of the fifth principal-surface electrode portion 22 at the one end 1A side (an outer edge at the one end side of the element body) is arranged near the one end 1A side from the center position of the element body 1 in the longitudinal direction. Meanwhile, an outer edge 22a of the fifth principal-surface electrode portion 22 at the other end 1B side is arranged at the substantially center position of each of the lateral portions 3b to 3e of the second terminal electrode 3 in the longitudinal direction. The second lead portions 24 and 26 are arranged such that the outer edges thereof at the other end 1B side are aligned with the outer edge 22a of the fifth principal-surface electrode portion 22. The fourth principal-surface electrode portion 21 and the sixth principal-surface electrode portion 23 have the same size in the width direction. The size of the fifth principal-surface electrode portion 22 in the width direction is greater than the size of each of the fourth principal-surface electrode portion 21 and the sixth principal-surface electrode portion 23 in the width direction. The second internal electrode 20 has a shape line-symmetrical with respect to the center axis of the dielectric layer 6 in the width direction.

In this embodiment, an exposed portion 41 where the surface of the dielectric layer 6 is exposed is formed near the other end 1B side more than the second lead portions 24 and 26. The exposed portion 41 has a side portion 41a between the outer edge 6c and the sixth principal-surface electrode portion 23, a side portion 41b between the outer edge 6b and the sixth principal-surface electrode portion 23, and a side portion 41c between the outer edge 6d and the sixth principal-surface electrode portion 23. An exposed portion 42 where the surface of the dielectric layer 6 is exposed is formed near the one end 1A side more than the second lead portions 24 and 26. The exposed portion 42 has a side portion 42a between the outer edge 6a and the fourth principal-surface electrode portion 21, a side portion 42b between the outer edge 6b and the fourth principal-surface electrode portion 21 and between the outer edge 6b and the fifth principal-surface electrode portion 22, and a side portion 42c between the outer edge 6d and the fourth principal-surface electrode portion 21 and between the outer edge 6d and the fifth principal-surface electrode portion 22.

Description will be provided as to how the first internal electrode 10 and the second internal electrode 20 formed as described above overlap each other when viewed from the lamination direction. The first principal-surface electrode portion 11 and the third principal-surface electrode portion 13 of the first internal electrode 10 respectively have the same size in the width direction as the fourth principal-surface electrode portion 21 and the sixth principal-surface electrode portion 23 of the second internal electrode 20. The second principal-surface electrode portion 12 of the first internal electrode 10 has the same size in the width direction as the fifth principal-surface electrode portion 22 of the second internal electrode 20. The outer edges of the first principal-surface electrode portion 11 and the sixth principal-surface electrode portion 23 at the other end 1B side are aligned with each other. The outer edges of the third principal-surface electrode portion 13 and the fourth principal-surface electrode portion 21 at the one end 1A side are aligned with each other. Thus, the first principal-surface electrode portion 11 overlaps the sixth principal-surface electrode portion 23 and also overlaps a portion of the fifth principal-surface electrode portion 22 at the other end 1B side. The second principal-surface electrode portion 12 overlaps a portion of the fifth principal-surface electrode portion 22 and also overlaps a portion of the fourth principal-surface electrode portion 21. The third principal-surface electrode portion 13 overlaps a portion of the fourth principal-surface electrode portion 21 at the one end 1A side. In the overlapping portion, the capacitive component of a capacitor is formed.

An edge portion 12c of the second principal-surface electrode portion 12 in the width direction and an edge portion 22c of the fifth principal-surface electrode portion 22 in the width direction function as a current path EL1 between the first lead portion 14 and the second lead portion 24. An edge portion 12d of the second principal-surface electrode portion 12 in the width direction and an edge portion 22d of the fifth principal-surface electrode portion 22 in the width direction function as a current path EL2 between the first lead portion 16 and the second lead portion 26. Thus, the edge portion 12c and the edge portion 22c have to overlap each other, or the outer edge 12b of the edge portion 12c at the other end 1B side and the outer edge 22b of the edge portion 22c at the one end 1A side have to be aligned with each other. The edge portion 12d and the edge portion 22d have to overlap each other, or the outer edge 12b of the edge portion 12d at the other end 1B side and the outer edge 22b of the edge portion 22d at the one end 1A side have to be aligned with each other. That is, when viewed from the lamination direction, the outer edge 12b of the second principal-surface electrode portion 12 at the other end 1B side has to be arranged near the other end 1B side more than the outer edge 22b of the fifth principal-surface electrode portion 22 at the one end 1A side, or has to be aligned with the outer edge 22b of the fifth principal-surface electrode portion 22 at the one end 1A side. In this embodiment, the outer edge 12b of the first internal electrode 12 extends to the front of the second lead portions 24 and 26 of the second internal electrode 20, and the outer edge 22b of the fifth principal-surface electrode portion 22 extends to the front of the first lead portions 14 and 16 of the first internal electrode 10. Thus, the edge portion 12c and the edge portion 22c overlap each other, and the edge portion 12d and the edge portion 22d overlap each other.

At the time of calcination of the element body 1, a portion where the dielectric layers 6 are in contact with each other is more rigidly fixed than a portion where the dielectric layer 6 and the internal electrode are in contact with each other. Thus, the exposed portion 31, the exposed portion 32, the exposed portion 41, and the exposed portion 42 are rigidly fixed to the rear surface of the overlaying dielectric layer 6 at the time of calcination of the element body 1. In particular, the first internal electrode 10 has not only the exposed portion 32 formed at the other end 1B side of the element body 1 but also the exposed portion 31 formed at the one end 1A side. The second internal electrode 20 has not only the exposed portion 42 at the one end 1A side of the element body 1 but also the exposed portion 41 at the other end 1B side. Thus, in the element body 1, the dielectric layers 6 are rigidly fixed to each other at both ends, improving adhesiveness.

Figure 4:
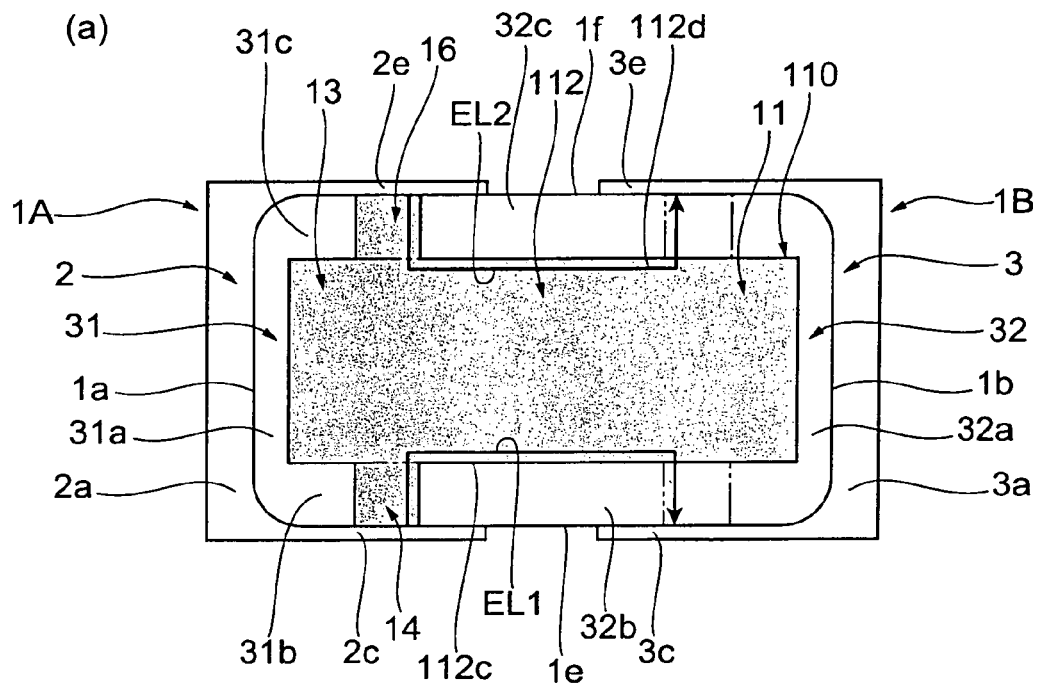
FIGS. 4A and 4B are diagrams of a first internal electrode of a known multilayer capacitor when viewed from a lamination direction.
Figure 4:
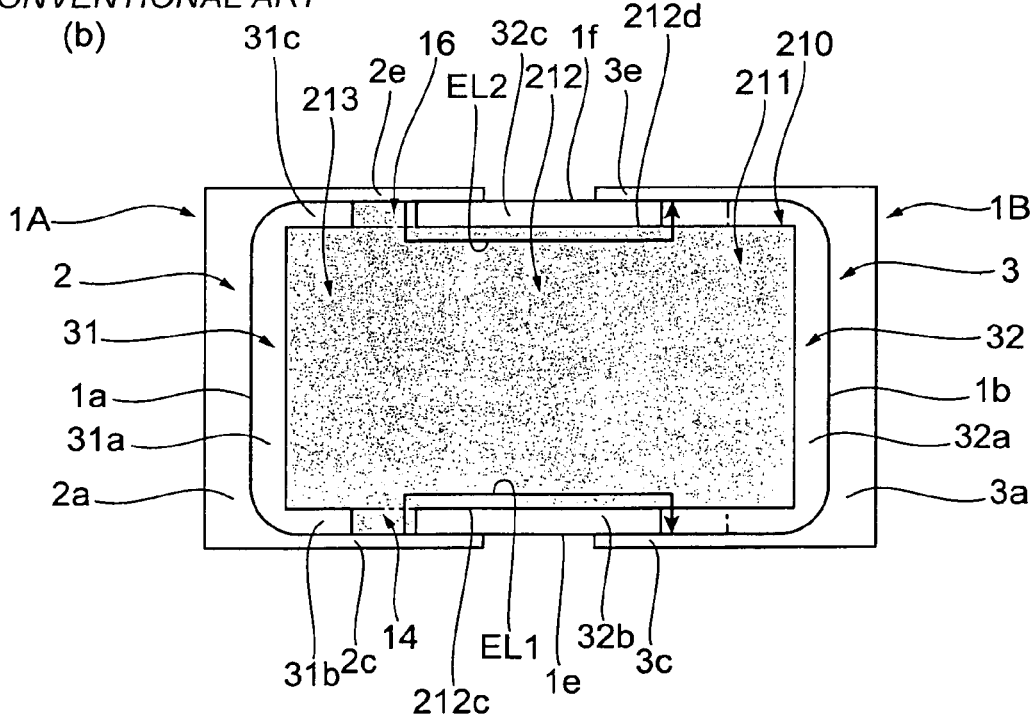

Next, the advantages of the multilayer capacitor C1 according to this embodiment will be described with reference to FIGS. 3A to 4B. FIGS. 4A and 4B are diagrams of an internal electrode of a known multilayer capacitor when viewed from the lamination direction. As shown in FIG. 4A, in an internal electrode 110 of a known multilayer capacitor, the size of a second principal-surface electrode portion 112 in the width direction is the same as the size of each of the first principal-surface electrode portion 11 and a third principal-surface electrode portion 13 in the width direction. That is, the first internal electrode 110 has a rectangular shape. As a result, first lead portions 14 and 16 are extended compared to the multilayer capacitor C1 according to this embodiment. A second internal electrode also has the same shape. In the known multilayer capacitor shown in FIG. 4A, current paths EL1 and EL2 are long, thus the ESL becomes large. In a first internal electrode 210 of a known multilayer capacitor shown in FIG. 4B, the widths of a first principal-surface electrode portion 211, a second principal-surface electrode portion 212, and a third principal-surface electrode portion 213 are all increased. That is, the first internal electrode 210 simply has a rectangular shape with an increased width. In this case, current paths EL1 and EL2 are shortened compared to FIG. 4A, reducing the ESL. However, the distance between the corner portion of the first principal-surface electrode portion 211 at the other end 1B side and the corner portions of an end surface 1b and lateral surfaces 1e and 1f in an element body 1 becomes excessively short, and a portion of the internal electrode may be exposed from the surface of the element body 1.

In the multilayer capacitor C1 according to this embodiment, the first lead portion 14 connects the second principal-surface electrode portion 12 and the first lateral portion 2c of the first terminal electrode 2, and the second lead portion 24 connects the fifth principal-surface electrode portion 22 and the second lateral portion 3c of the second terminal electrode 3. The first lead portion 16 connects the second principal-surface electrode portion 12 and the first lateral portion 2e of the first terminal electrode 2, and the second lead portion 26 connects the fifth principal-surface electrode portion 22 and the second lateral portion 3e of the second terminal electrode 3. In this way, the first lead portion 14 and the second lead portion 24 having different polarities are led to the same lateral surface 1e of the element body 1, and the terminal electrodes 2 and 3 respectively have the lateral portions 2c and 3c formed at the lateral surface 1e. The first lead portion 16 and the second lead portion 26 having different polarities are led to the same lateral surface 1f of the element body 1, and the terminal electrodes 2 and 3 respectively have the lateral portions 2e and 3e formed at the lateral surface 1f. Thus, the inter-lead-electrode distance between the first lead portions 14 and 16 and the second lead portions 24 and 26 having different polarities is shortened compared to a case where the internal electrode is simply led from the end surface 1a or the end surface 1b of the element body 1. That is, the current paths EL1 and EL2 are shortened, reducing the ESL. Each lead portion is led to the lateral surface of the element body 1, such that variations in the ESL depending on the mounting direction can be reduced. In the width direction, the second principal-surface electrode portion 12 is greater than the first principal-surface electrode portion 11, and the fifth principal-surface electrode portion 22 is greater than the fourth principal-surface electrode portion 21. When viewed from the lamination direction, the outer edge 12b of the second principal-surface electrode portion 12 at the other end 1B side is arranged near the other end 1B side more than the outer edge 22b of the fifth principal-surface electrode portion 22 at the one end 1A side. The first lead portions 14 and 16 are connected to the second principal-surface electrode portion 12, and the second lead portions 24 and 26 are connected to the fifth principal-surface electrode portion 22. Thus, the edge portions 12c and 12d which are the portions of the second principal-surface electrode portion 12 greater than the first principal-surface electrode portion 11 and the edge portions 22c and 22d which are the portions of the fifth principal-surface electrode portion 22 greater than the fourth principal-surface electrode portion 21 function as the current paths EL1 and EL2 between the first lead portions 14 and 16 and the second lead portions 24 and 26. Therefore, the current paths EL1 and EL2 can be shortened, and the ESL can be reduced.

Second Embodiment

Figure 5:
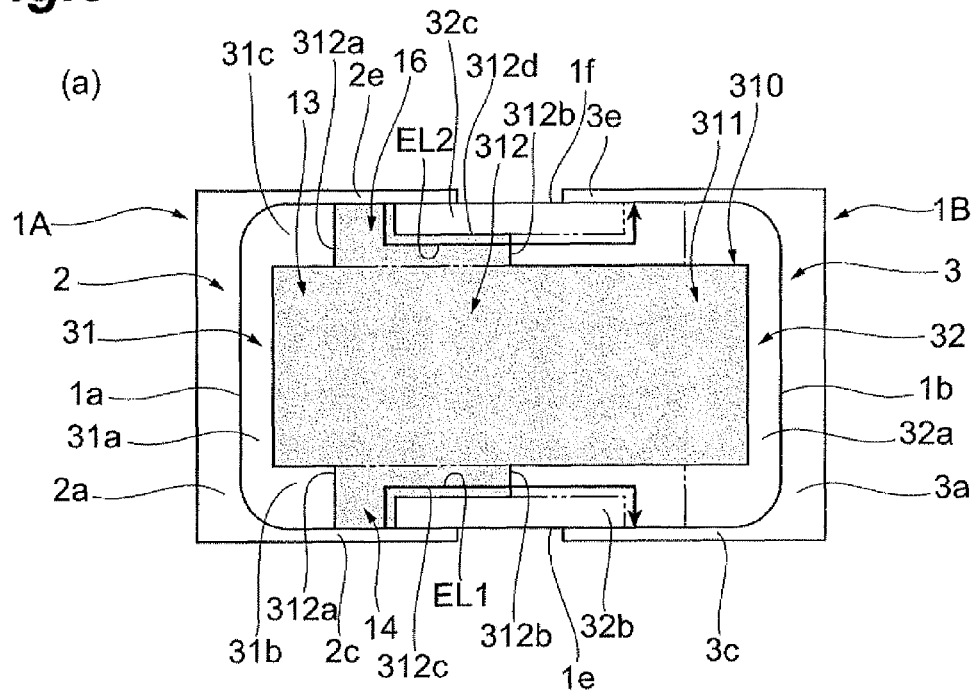
FIGS. 5A and 5B are diagrams of a first internal electrode and a second internal electrode of a multilayer capacitor according to a second embodiment when viewed from a lamination direction.
Figure 5:
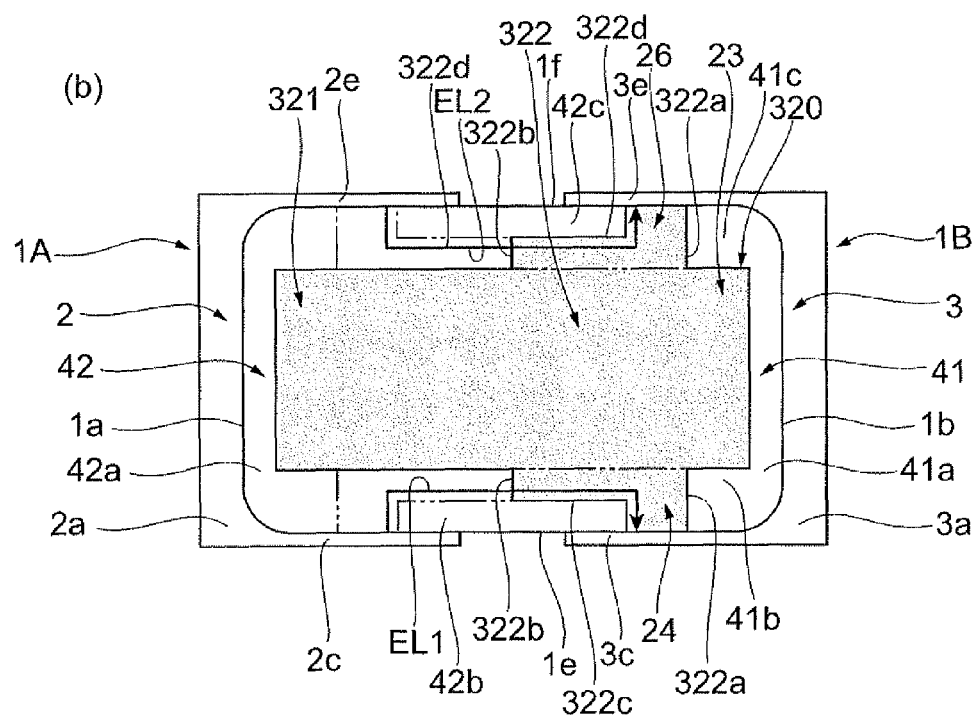

A multilayer capacitor according to a second embodiment will be described with reference to FIGS. 5A and 5B. FIGS. 5A and 5B are diagrams of a first internal electrode and a second internal electrode of the multilayer capacitor according to the second embodiment when viewed from the lamination direction. The multilayer capacitor according to the second embodiment is mainly different from the multilayer capacitor according to the first embodiment in that a second principal-surface electrode portion 312 of a first internal electrode 310 and a fifth principal-surface electrode portion 322 of a second internal electrode 320 have a short length in the longitudinal direction.

While an outer edge 312a of the second principal-surface electrode portion 312 is arranged near the one end 1A side, an outer edge 312b of the second principal-surface electrode portion 312 of the first internal electrode 310 at the other end 1B side is arranged at the center position of the element body 1 in the longitudinal direction. Accordingly, the end portion of the first principal-surface electrode portion 311 at the one end 1A side is also arranged at the center position of the element body 1 in the longitudinal direction. While an outer edge 322a of the fifth principal-surface electrode portion 322 is arranged near the other end 1B side, an outer edge 322b of the fifth principal-surface electrode portion 322 of the second internal electrode 320 at the one end 1A side is arranged at the center position of the element body 1 in the longitudinal direction. Accordingly, the end portion of the fourth principal-surface electrode portion 321 at the other end 1B side is also arranged at the center position of the element body 1 in the longitudinal direction. Hence, when viewed from the lamination direction, the outer edge 312b of the second principal-surface electrode portion 312 at the other end 1B side is arranged so as to be aligned with the outer edge 322b of the fifth principal-surface electrode portion 322 at the one end 1A side. Thus, edge portions 312c and 312d which are portions of the second principal-surface electrode portion 312 greater than the first principal-surface electrode portion 311 and edge portions 322c and 322d which are portions of the fifth principal-surface electrode portion 322 greater than the fourth principal-surface electrode portion 321 function as the current paths EL1 and EL2 between the first lead portions 14 and 16 and the second lead portions 24 and 26. Therefore, the current paths EL1 and EL2 can be shortened, and the ESL can be reduced.

Third Embodiment

Figure 6:
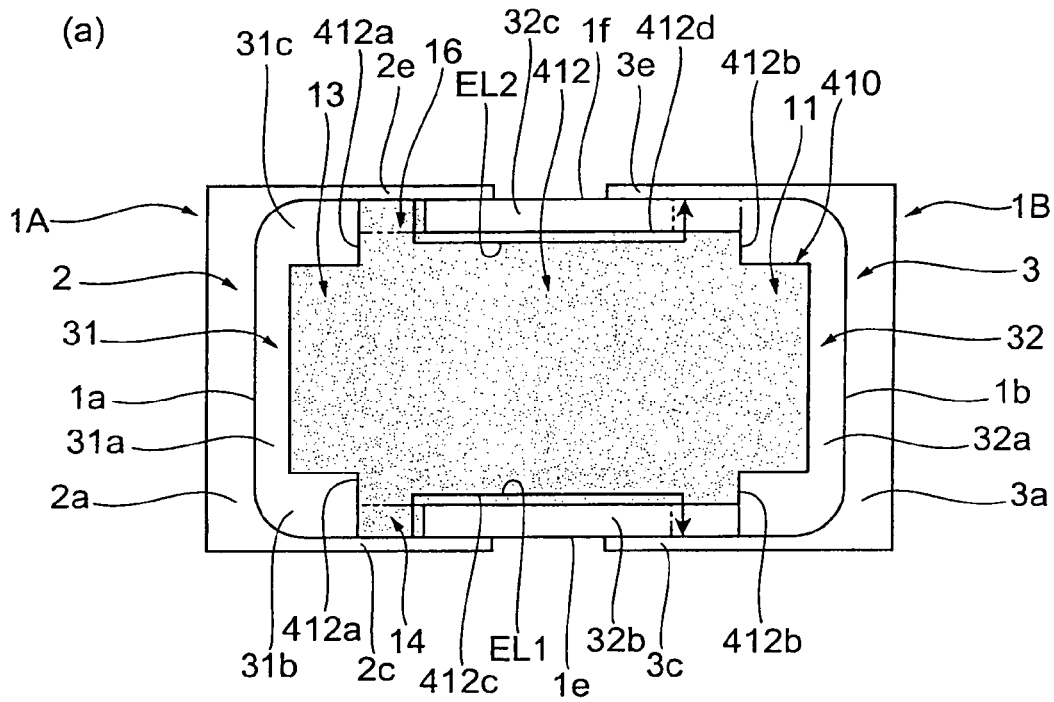
FIGS. 6A and 6B are diagrams of a first internal electrode and a second internal electrode of a multilayer capacitor according to a third embodiment when viewed from a lamination direction.
Figure 6:
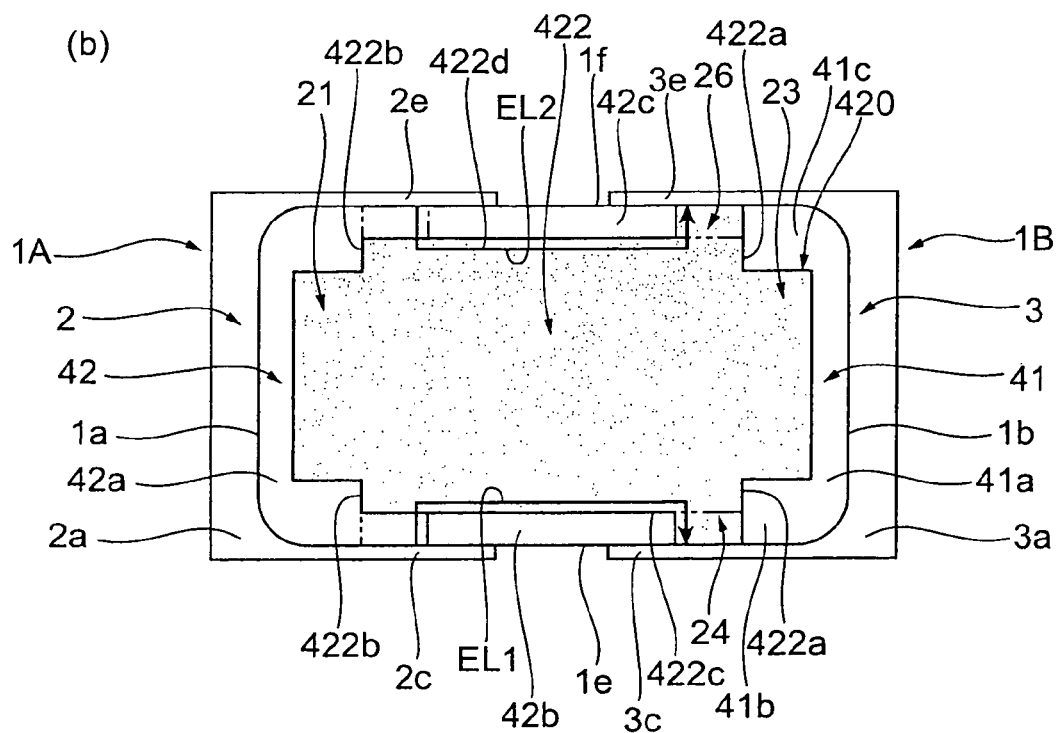

A multilayer capacitor according to a third embodiment will be described with reference to FIGS. 6A and 6B. FIGS. 6A and 6B are diagrams of a first internal electrode and a second internal electrode of the multilayer capacitor according to the third embodiment when viewed from the lamination direction. The multilayer capacitor according to the third embodiment is different from the multilayer capacitor according to the first embodiment in that, in the longitudinal direction, the outer edge of a second principal-surface electrode portion at the other end 1B side extends to the second lead portions, and the outer edge of a fifth principal-surface electrode portion at the one end 1A side of the element body extends to first lead portions.

Specifically, an outer edge 412b of a second principal-surface electrode portion 412 of a first internal electrode 410 at the other end 1B side is aligned with an outer edge 422a of a fifth principal-surface electrode portion 422 of a second internal electrode 420 at the other end 1B side (that is, the outer edges of the second lead portions 24 and 26 at the other end 1B side). An outer edge 422b of the fifth principal-surface electrode portion 422 of the second internal electrode 420 at the one end 1A side is aligned with an outer edge 412a of the second principal-surface electrode portion 412 of the first internal electrode 410 at the one end 1A side (that is, the outer edges of the first lead portions 14 and 16 at the one end 1A side). In this way, in the longitudinal direction, the outer edge 412b of the second principal-surface electrode portion 412 at the other end 1B side extends to the second lead portions 24 and 26, and the outer edge 422b of the fifth principal-surface electrode portion 422 at the one end 1A side extends to the first lead portions 14 and 16. Therefore, the current paths EL1 and EL2 can be ensured reliably, and as a result, the ESL can be reduced.

Fourth Embodiment

Figure 7:
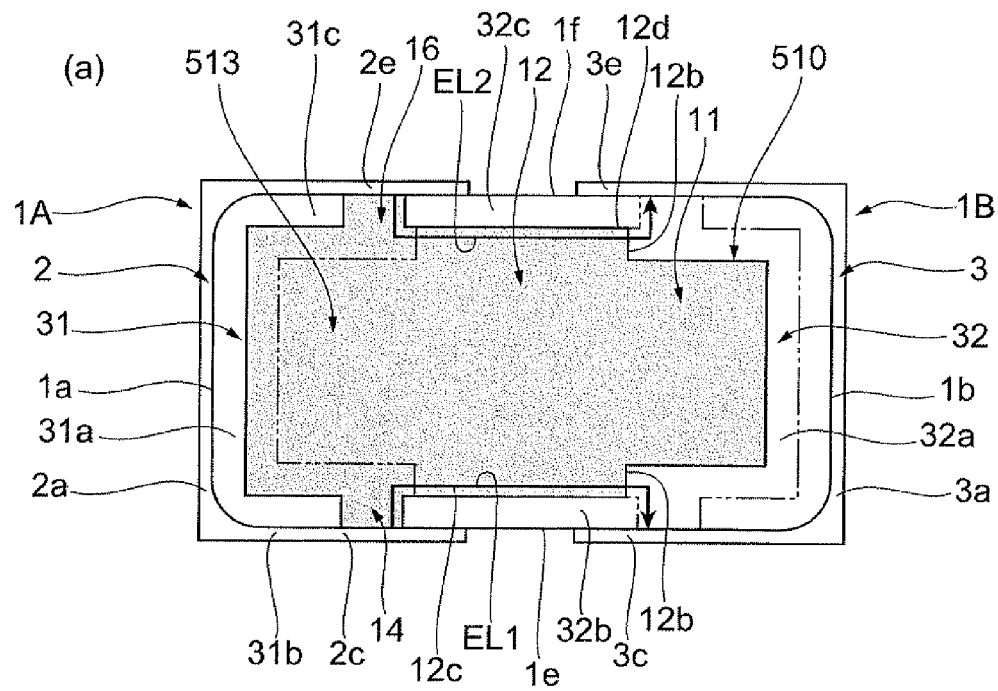
FIGS. 7A and 7B are diagrams of a first internal electrode and a second internal electrode of a multilayer capacitor according to a fourth embodiment when viewed from a lamination direction.
Figure 7:
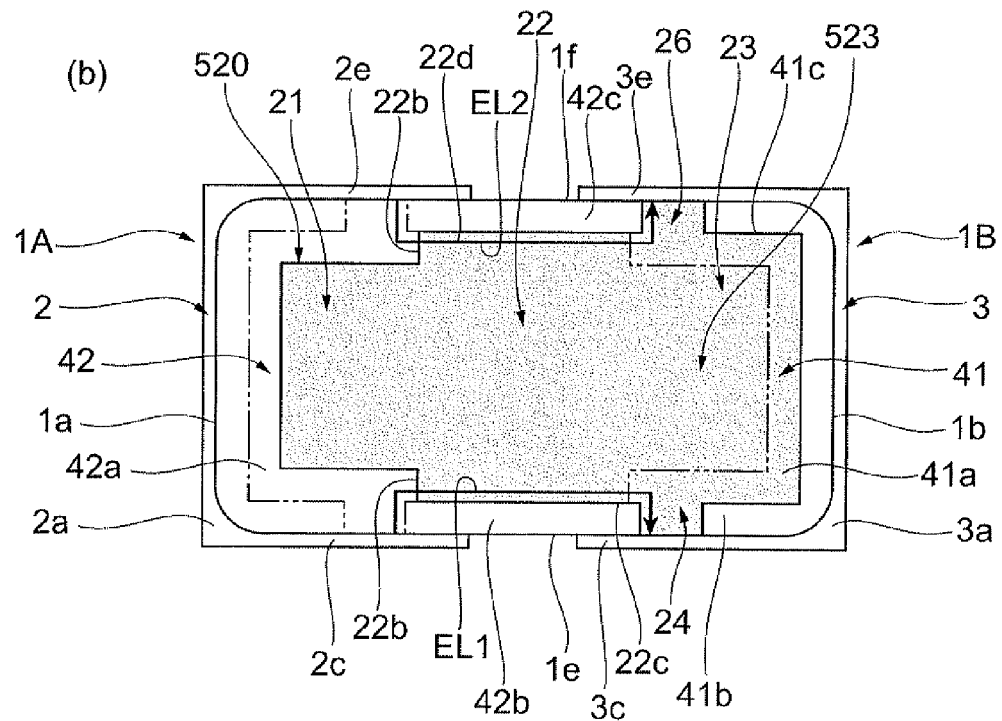

A multilayer capacitor according to a fourth embodiment will be described with reference to FIGS. 7A and 7B. FIGS. 7A and 7B are diagrams of a first internal electrode and a second internal electrode of the multilayer capacitor according to the fourth embodiment when viewed from the lamination direction. The multilayer capacitor of the fourth embodiment is different from the multilayer capacitor according to the first embodiment in that, when viewed from the lamination direction, the outer edge of a third principal-surface electrode portion 513 is arranged so as to surround the forefront portion of the fourth principal-surface electrode portion 21 at the one end 1A side, and the outer edge of a sixth principal-surface electrode portion 523 is arranged so as to surround the forefront portion of the first principal-surface electrode portion 11 at the other end 1B side.

Specifically, the size of the third principal-surface electrode portion 513 of a first internal electrode 510 in the width direction is the same as the size of the second principal-surface electrode portion 12 in the width direction. Hence, the third principal-surface electrode portion 513 of the first internal electrode 510 becomes greater than the fourth principal-surface electrode portion 21 of a second internal electrode 520. The size of the sixth principal-surface electrode portion 523 of the second internal electrode 520 in the width direction is the same as the size of the fifth principal-surface electrode portion 22 in the width direction. Hence, the sixth principal-surface electrode portion 523 of the second internal electrode 520 becomes greater than the first principal-surface electrode portion 11 of the first internal electrode 510. For example, when viewed from the lamination direction, the third principal-surface electrode portion of the first internal electrode and the fourth principal-surface electrode portion of the second internal electrode may have the same size. In such a case, when lamination misalignment occurs at the time of lamination of the dielectric layers 6, a region occurs between the third principal-surface electrode portion and the fourth principal-surface electrode portion where the third principal-surface electrode portion and the fourth principal-surface electrode portion do not overlap each other, and a capacitive component is not formed. Accordingly, variations in electrostatic capacitance of the multilayer capacitor may occur. However, in the multilayer capacitor according to the fourth embodiment, when viewed from the lamination direction, the outer edge of the third principal-surface electrode portion 513 is arranged so as to surround the forefront portion of the fourth principal-surface electrode portion 21 at the one end 1A side, and the outer edge of the sixth principal-surface electrode portion 523 is arranged so as to surround the forefront portion of the first principal-surface electrode portion 11 at the other end 1B side. Thus, even when lamination misalignment occurs, the third principal-surface electrode portion 513 can be maintained in a state of overlapping the fourth principal-surface electrode portion 21, and the sixth principal-surface electrode portion 523 can be maintained in a state of overlapping the first principal-surface electrode portion 11. Therefore, variations in electrostatic capacitance due to lamination misalignment can be suppressed.

Fifth Embodiment

Figure 8:
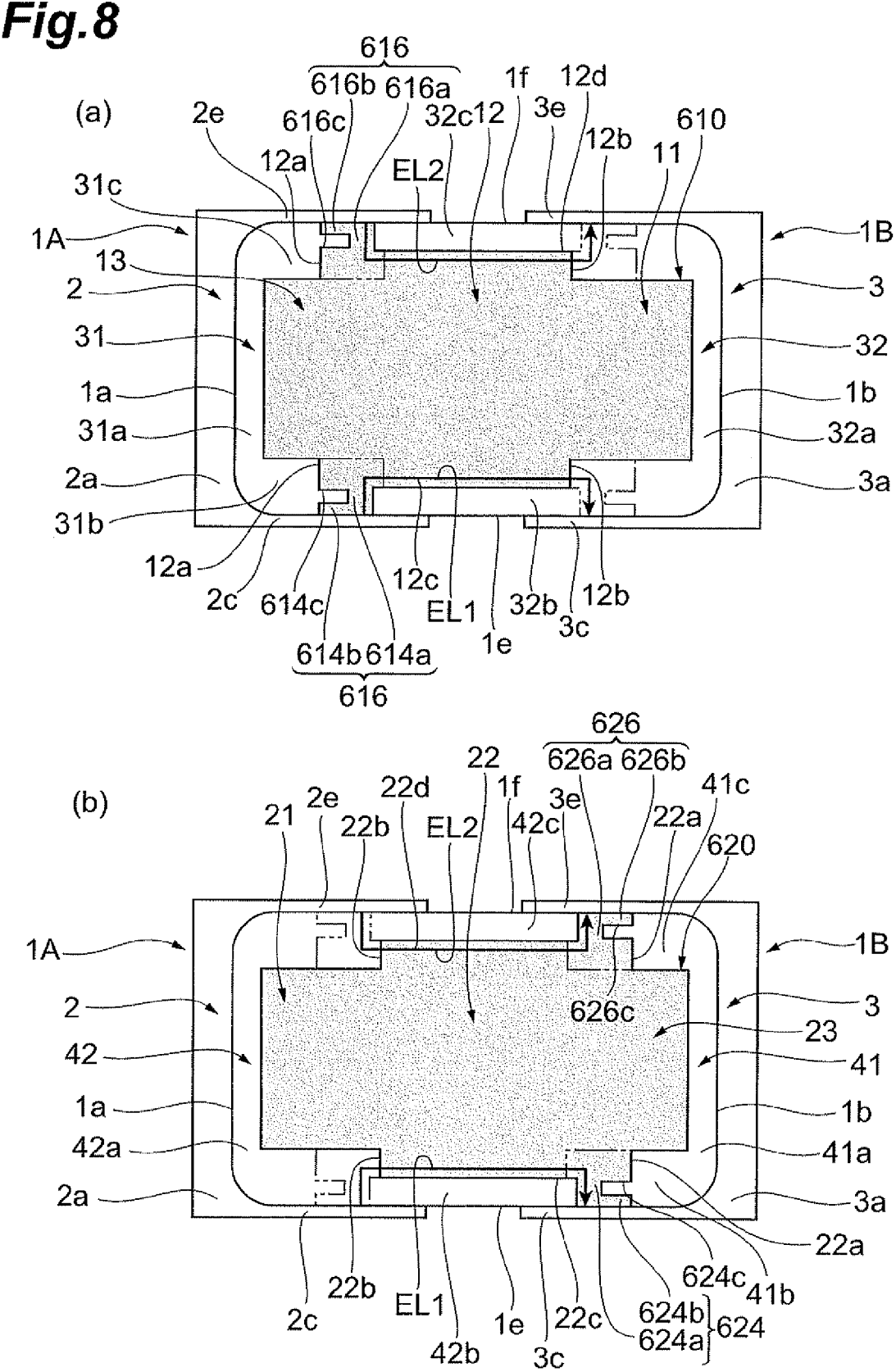
FIGS. 8A and 8B are diagrams of a first internal electrode and a second internal electrode of a multilayer capacitor according to a fifth embodiment when viewed from a lamination direction.

A multilayer capacitor according to the fifth embodiment will be described with reference to FIGS. 8A and 8B. FIGS. 8A and 8B are diagrams of a first internal electrode and a second internal electrode of the multilayer capacitor according to the fifth embodiment when viewed from the lamination direction. The multilayer capacitor according to the fifth embodiment is different from the multilayer capacitor according to the first embodiment in terms of the shapes of first lead portions 614 and 616 of a first internal electrode 610 and second lead portions 624 and 626 of a second internal electrode 620.

Specifically, the first lead portions 614 and 616 of the first internal electrode 610 respectively have first small-width portions 614a and 616a extending from the second principal-surface electrode portion 12 in the width direction, and also respectively have first connection portions 614b and 616b extending to the one end 1A side at portions where connection is made to the first lateral portions 2c and 2e of the first terminal electrode 2. The second lead portions 624 and 626 of the second internal electrode 620 respectively have second small-width portions 624a and 626a extending from the fifth principal-surface electrode portion 22 in the width direction, and also respectively have second connection portions 624b and 626b extending to the other end 1B side at portions where connection is made to second lateral portions 3c and 3e of the second terminal electrode 3. The first lead portions 614 and 616 respectively have a shape with slits 614c and 616c extending from the one end 1A side to the other end 1B side with respect to the first lead portions 14 and 16 according to the first embodiment. The second lead portions 624 and 626 respectively have a shape with slits 624c and 626c extending from the other end 1B side to the one end 1A side with respect to the second lead portions 24 and 26 according to the first embodiment. In the longitudinal direction of the slits 614c, 616c, 624c, and 626c, the occupying ratio of each of the slits 614c, 616c, 624c, and 626c with respect to a corresponding one of the lead portions 14, 16, 24, and 26 is in a range of 50% to 70%. In the width direction, the occupying ratio of each of the slits 614c, 616c, 624c, and 626c with respect to a corresponding one of the lead portions 14, 16, 24, and 26 is in a range of 30% to 50%. With this configuration, the current paths EL1 and EL2 can be shortened because of the small-width portions 614a, 616a, 624a, and 626a arranged inside the element body 1, and the ESL can be made low. In addition, since the connection portions 614b, 616b, 624b, and 626b are formed, connectivity to the terminal electrodes 2 and 3 can be ensured. The surfaces of the dielectric layers 6 are exposed from the slits 614c, 616c, 624c, and 626c between the small-width portions 614a, 616a, 624a, and 626a and the connection portions 614b, 616b, 624b, and 626b, increasing the exposed area of each of the exposed portions 31, 32, 41, and 42. Therefore, adhesiveness of the element body 1 can be improved. With the small-width portions 614a, 616a, 624a, and 626a, the ESL can be adjusted.

Sixth Embodiment

Figure 9:
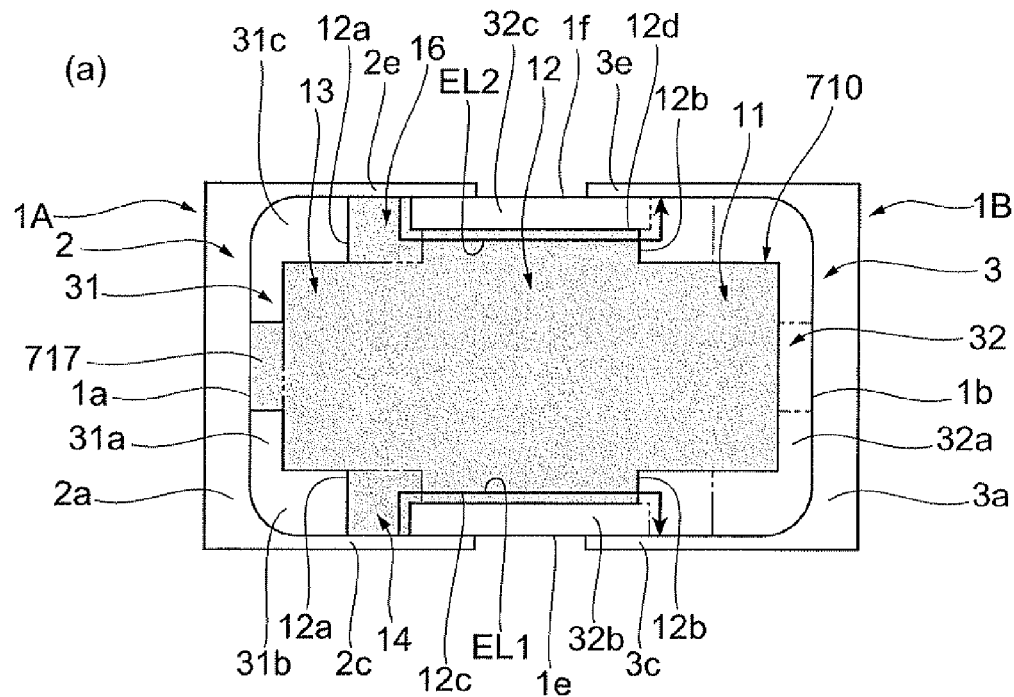
FIGS. 9A and 9B are diagrams of a first internal electrode and a second internal electrode of a multilayer capacitor according to a sixth embodiment when viewed from a lamination direction.
Figure 9:
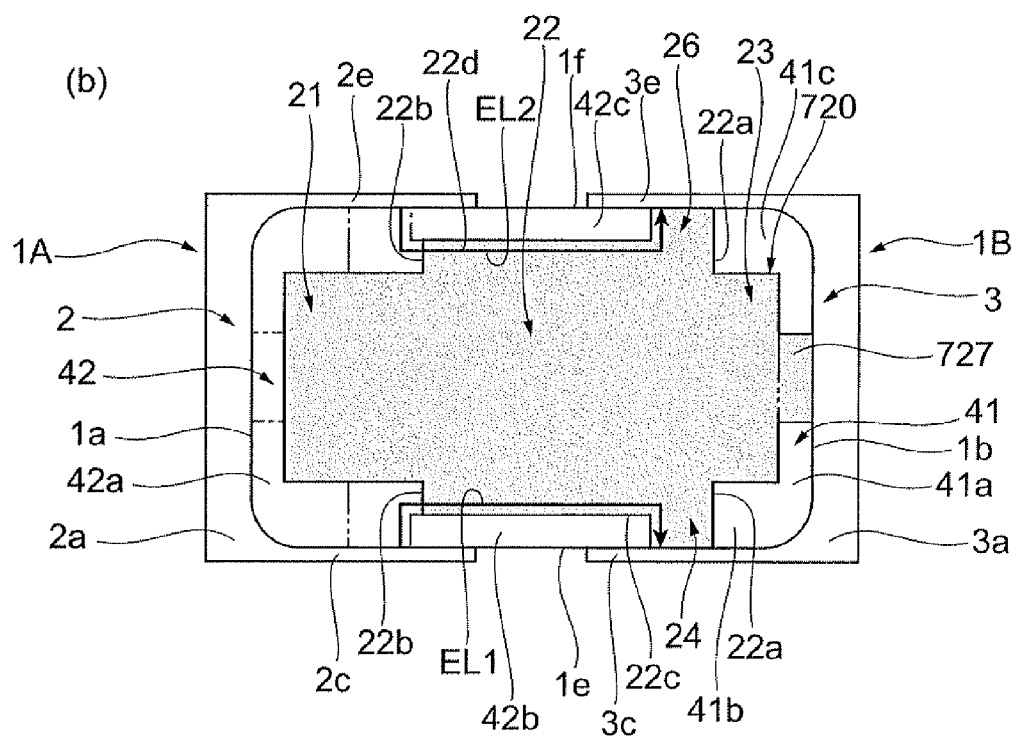

A multilayer capacitor according to a sixth embodiment will be described with reference to FIGS. 9A and 9B. FIGS. 9A and 9B are diagrams of a first internal electrode and a second internal electrode of the multilayer capacitor according to the sixth embodiment when viewed from the lamination direction. The multilayer capacitor of the sixth embodiment is different from the multilayer capacitor according to the first embodiment in that a first internal electrode 710 has a first additional lead portion 717, and a second internal electrode 720 has a second additional lead portion 727. The first additional lead portion 717 extends from the outer edge of the third principal-surface electrode portion 13 at the one end 1A side to the first end portion 2a of the first terminal electrode 2. The second additional lead portion 727 extends from the outer edge of the sixth principal-surface electrode portion 23 at the other end 1B side to the second end portion 3a of the second terminal electrode 3. With an increase in the number of lead portions, the ESL can be further reduced.

The invention is not limited to the above-described embodiments. For example, although in the multilayer capacitor C1 shown in FIG. 1, the terminal electrodes 2 and 3 cover the four lateral surfaces, at least the lateral surfaces 1d and 1f may be covered while the lateral surfaces 1c and 1e may not be covered.

In the invention, the size or shape of the third principal-surface electrode portion near the one end 1A side more than the first lead portion is not particularly limited. The third principal-surface electrode portion may not be provided, and the first internal electrode may include only the first principal-surface electrode portion, the second principal-surface electrode portion, and the first lead portions. The size or shape of the sixth principal-surface electrode portion near the other end 1B side more than the second lead portion is not particularly limited. The sixth principal-surface electrode portion may not be provided, and the second internal electrode may include only the fourth principal-surface electrode portion, the fifth principal-surface electrode portion, and the second lead portions.

What is claimed is:

1. A multilayer capacitor comprising:
an element body formed by laminating a plurality of dielectric layers, the element body having a pair of end surfaces and four lateral surfaces connecting the end surfaces;
a first terminal electrode covering one end side of the element body;
a second terminal electrode covering an other end side of the element body;
a first internal electrode formed inside the element body so as to extend between the one end side of the element body and the other end side of the element body, and electrically connected to the first terminal electrode; and
a second internal electrode formed inside the element body so as to extend between the one end side of the element body and the other end side of the element body with a dielectric layer sandwiched between the second internal electrode and first internal electrode, and electrically connected to the second terminal electrode,
wherein the first terminal electrode has a first end portion covering the end surface at the one end side of the element body and first lateral portions covering the one end side of the element body at the four lateral surfaces,
the second terminal electrode has a second end portion covering the end surface at the other end side of the element body and second lateral portions covering the other end side of the element body at the four lateral surfaces,
the first internal electrode has a first principal-surface electrode portion and a second principal-surface electrode portion in order from the other end side of the element body toward the one end side of the element body, and a first lead portion respectively connecting the second principal-surface electrode portion and the first lateral portion of the first terminal electrode,
the second internal electrode has a fourth principal-surface electrode portion and a fifth principal-surface electrode portion in order from the one end side of the element body toward the other end side of the element body, and a second lead portion respectively connecting the fifth principal-surface electrode portion and the second lateral portion of the second terminal electrode,
in a width direction of the first internal electrode and the second internal electrode, the second principal-surface electrode portion is greater than the first principal-surface electrode portion, and the fifth principal-surface electrode portion is greater than the fourth principal-surface electrode portion,
when viewed from a lamination direction of the element body, an outer edge of the second principal-surface electrode portion at the other end side of the element body is arranged near the other end side more than an outer edge of the fifth principal-surface electrode portion at the one end side of the element body, or arranged so as to be aligned with the outer edge of the fifth principal-surface electrode portion at the one end side of the element body,
the first internal electrode has a third principal-surface electrode portion at the one end side of the element body in the second principal-surface electrode portion,
the second internal electrode has a sixth principal-surface electrode portion at the other end side of the element body in the fifth principal-surface electrode portion,
in the width direction, the third principal-surface electrode portion is smaller than the second principal-surface electrode portion, and the sixth principal-surface electrode portion is smaller than the fifth principal-surface electrode portion,
outer edges of the first principal-surface electrode portion are separate from the lateral surfaces and extend straight along a longitudinal direction from the outer edge of the second principal-surface electrode portion at the other end side of the element body,
outer edges of the fourth principal-surface electrode portion are separated from the lateral surfaces and extend straight along a longitudinal direction from the outer edge of the fifth principal-surface electrode portion at the one side of the element body,
an outer edge of the first lead portion at the one end side of the element body is aligned with the outer edge of the second principal-surface electrode portion at the one end side of the element body,
an outer edge of the second lead portion at the other end side of the element body is aligned with the outer edge of the fifth principal-surface electrode portion at the other end side of the element body, and
in a longitudinal direction of the first internal electrode and the second internal electrode, the outer edge of the second principal-surface electrode portion at the other end side of the element body extends to the second lead portion, and the outer edge of the fifth principal-surface electrode portion at the one end side of the element body extends to the first lead portion.

2. The multilayer capacitor according to claim 1, wherein the first internal electrode has a first additional lead portion connected to the first end portion of the first terminal electrode, and
the second internal electrode has a second additional lead portion connected to the second end portion of the second terminal electrode.

3. The multilayer capacitor according to claim 2, wherein the first additional lead portion connected to an outer edge of the third principal-surface electrode portion at the one end side of the element body, and
the second additional lead portion connected to an outer edge of the sixth principal-surface electrode portion at the other end side of the element body.

4. The multilayer capacitor according to claim 2, wherein in the width direction, the first additional lead portion is smaller than the third principal-surface electrode portion, and the second additional lead portion is smaller than the sixth principal-surface electrode portion.

5. A multilayer capacitor comprising:
an element body formed by laminating a plurality of dielectric layers, the element body having a pair of end surfaces and four lateral surfaces connecting the end surfaces;
a first terminal electrode covering one end side of the element body;
a second terminal electrode covering an other end side of the element body;
a first internal electrode formed inside the element body so as to extend between the one end side of the element body and the other end side of the element body, and electrically connected to the first terminal electrode; and
a second internal electrode formed inside the element body so as to extend between the one end side of the element body and the other end side of the element body with a dielectric layer sandwiched between the second internal electrode and first internal electrode, and electrically connected to the second terminal electrode,
wherein the first terminal electrode has a first end portion covering the end surface at the one end side of the element body and first lateral portions covering the one end side of the element body at the four lateral surfaces,
the second terminal electrode has a second end portion covering the end surface at the other end side of the element body and second lateral portions covering the other end side of the element body at the four lateral surfaces,
the first internal electrode has a first principal-surface electrode portion and a second principal-surface electrode portion in order from the other end side of the element body toward the one end side of the element body, and a first lead portion respectively connecting the second principal-surface electrode portion and the first lateral portion of the first terminal electrode,
the second internal electrode has a fourth principal-surface electrode portion and a fifth principal-surface electrode portion in order from the one end side of the element body toward the other end side of the element body, and a second lead portion respectively connecting the fifth principal-surface electrode portion and the second lateral portion of the second terminal electrode,
in a width direction of the first internal electrode and the second internal electrode, the second principal-surface electrode portion is greater than the first principal-surface electrode portion, and the fifth principal-surface electrode portion is greater than the fourth principal-surface electrode portion,
when viewed from a lamination direction of the element body, an outer edge of the second principal-surface electrode portion at the other end side of the element body is arranged near the other end side more than an outer edge of the fifth principal-surface electrode portion at the one end side of the element body,
in a longitudinal direction of the first internal electrode and the second internal electrode, the outer edge of the second principal-surface electrode portion at the other end side of the element body extends to the second lead portion and does not extend past the second lead portion, and the outer edge of the fifth principal-surface electrode portion at the one end side of the element body extends to the first lead portion and does not extend past the first lead portion,
outer edges of the first principal-surface electrode portion are separate from the lateral surfaces and extend straight along a longitudinal direction from the outer edge of the second principal-surface electrode portion at the other end side of the element body, and
outer edges of the fourth principal-surface electrode portion are separated from the lateral surfaces and extend straight along a longitudinal direction from the outer edge of the fifth principal-surface electrode portion at the one side of the element body.

6. The multilayer capacitor according to claim 5, wherein the first lead portion has a first small-width portion extending from the second principal-surface electrode portion in the width direction and a first connection portion extending toward the one end side of the element body at a portion where connection is made to the first lateral portion of the first terminal electrode, and
the second lead portion has a second small-width portion extending from the fifth principal-surface electrode portion in the width direction and a second connection portion extending toward the other end side of the element body at a portion where connection is made to the second lateral portion of the second terminal electrode.

7. The multilayer capacitor according to claim 5, wherein the first internal electrode has a first additional lead portion connected to the first end portion of the first terminal electrode, and
the second internal electrode has a second additional lead portion connected to the second end portion of the second terminal electrode.

8. The multilayer capacitor according to claim 5, wherein the first internal electrode has a third principal-surface electrode portion at the one end side of the element body in the second principal-surface electrode portion,
the second internal electrode has a sixth principal-surface electrode portion at the other end side of the element body in the fifth principal-surface electrode portion,
in the lamination direction of the element body, the fourth principal-surface electrode portion overlaps the third principal-surface electrode portion, and the first principal-surface electrode portion overlaps the sixth principal-surface electrode portion, and
when viewed from the lamination direction, an outer edge of the third principal-surface electrode portion is arranged so as to surround a forefront portion of the fourth principal-surface electrode portion at the one end side of the element body, and an outer edge of the sixth principal-surface electrode portion is arranged so as to surround a forefront portion of the first principal-surface electrode portion at the other end side of the element body.

9. A multilayer capacitor comprising:
an element body formed by laminating a plurality of dielectric layers, the element body having a pair of end surfaces and four lateral surfaces connecting the end surfaces;
a first terminal electrode covering one end side of the element body;
a second terminal electrode covering an other end side of the element body;
a first internal electrode formed inside the element body so as to extend between the one end side of the element body and the other end side of the element body, and electrically connected to the first terminal electrode; and
a second internal electrode formed inside the element body so as to extend between the one end side of the element body and the other end side of the element body with a dielectric layer sandwiched between the second internal electrode and first internal electrode, and electrically connected to the second terminal electrode,
wherein the first terminal electrode has a first end portion covering the end surface at the one end side of the element body and first lateral portions covering the one end side of the element body at the four lateral surfaces,
the second terminal electrode has a second end portion covering the end surface at the other end side of the element body and second lateral portions covering the other end side of the element body at the four lateral surfaces,
the first internal electrode has a first principal-surface electrode portion and a second principal-surface electrode portion in order from the other end side of the element body toward the one end side of the element body, and a first lead portion respectively connecting the second principal-surface electrode portion and the first lateral portion of the first terminal electrode,
the second internal electrode has a fourth principal-surface electrode portion and a fifth principal-surface electrode portion in order from the one end side of the element body toward the other end side of the element body, and a second lead portion respectively connecting the fifth principal-surface electrode portion and the second lateral portion of the second terminal electrode,
in a width direction of the first internal electrode and the second internal electrode, the second principal-surface electrode portion is greater than the first principal-surface electrode portion, and the fifth principal-surface electrode portion is greater than the fourth principal-surface electrode portion,
when viewed from a lamination direction of the element body, an outer edge of the second principal-surface electrode portion at the other end side of the element body is arranged near the other end side more than an outer edge of the fifth principal-surface electrode portion at the one end side of the element body, or arranged so as to be aligned with the outer edge of the fifth principal-surface electrode portion at the one end side of the element body,
the first internal electrode has a third principal-surface electrode portion at the one end side of the element body in the second principal-surface electrode portion,
the second internal electrode has a sixth principal-surface electrode portion at the other end side of the element body in the fifth principal-surface electrode portion,
in the width direction, the third principal-surface electrode portion is smaller than the second principal-surface electrode portion, and the sixth principal-surface electrode portion is smaller than the fifth principal-surface electrode portion,
outer edges of the first principal-surface electrode portion are separate from the lateral surfaces and extend straight along a longitudinal direction from the outer edge of the second principal-surface electrode portion at the other end side of the element body,
outer edges of the fourth principal-surface electrode portion are separated from the lateral surfaces and extend straight along a longitudinal direction from the outer edge of the fifth principal-surface electrode portion at the one side of the element body,
an outer edge of the first lead portion at the one end side of the element body is aligned with the outer edge of the second principal-surface electrode portion at the one end side of the element body,
an outer edge of the second lead portion at the other end side of the element body is aligned with the outer edge of the fifth principal-surface electrode portion at the other end side of the element body,
the first lead portion has a first small-width portion extending from the second principal-surface electrode portion in the width direction and a first connection portion extending toward the one end side of the element body at a portion where connection is made to the first lateral portion of the first terminal electrode, and
the second lead portion has a second small-width portion extending from the fifth principal-surface electrode portion in the width direction and a second connection portion extending toward the other end side of the element body at a portion where connection is made to the second lateral portion of the second terminal electrode.

* * * * *